United States Patent [19]

Rackerby et al.

[11] Patent Number: 4,982,347

[45] Date of Patent: Jan. 1, 1991

[54] PROCESS AND APPARATUS FOR PRODUCING TEMPERATURE PROFILES IN A WORKPIECE AS IT PASSES THROUGH A BELT FURNACE

[75] Inventors: Robert E. Rackerby, San Diego; Jon L. Zimmerman, Escondido, both of Calif.

[73] Assignee: Unisys Corporation, Blue Bell, Pa.

[21] Appl. No.: 370,370

[22] Filed: Jun. 22, 1989

[51] Int. Cl.$^5$ .................. G05D 23/00; G06F 15/46; H05B 6/64

[52] U.S. Cl. .................. 364/557; 364/477; 374/137; 236/15 BF; 219/10.71

[58] Field of Search .................. 364/550, 551.01, 557, 364/477; 374/141, 153, 137; 219/413, 494, 10.57, 10.69, 10.71, 10.77, 10.81; 357/23.3, 67; 236/15 BB, 15 BF; 165/26

[56] References Cited

U.S. PATENT DOCUMENTS

| | | | |
|---|---|---|---|
| 4,449,037 | 5/1984 | Shibamata et al. | 219/10.69 X |
| 4,510,363 | 4/1985 | Reynolds, Jr. | 219/10.71 |
| 4,605,161 | 8/1986 | Motomiya et al. | 236/15 BB X |
| 4,675,826 | 6/1987 | Gentry et al. | 364/557 X |
| 4,841,457 | 6/1989 | Clyne et al. | 364/557 |
| 4,857,689 | 8/1989 | Lee | 219/10.77 X |
| 4,881,591 | 11/1989 | Rignall | 364/557 X |
| 4,887,229 | 12/1989 | Weiss | 364/557 |
| 4,907,177 | 3/1990 | Curreri et al. | 236/15 BF |

Primary Examiner—Joseph L. Dixon
Attorney, Agent, or Firm—Charles J. Fassbender; Mark T. Starr

[57] ABSTRACT

A given target temperature profile T is produced in a workpiece as it passes through an elongated passageway of a belt furnace by the steps of: (1) determining a set of temperature setting $TS_X$ for the belt furnace thermostats which satisfy an equation $f(\alpha, TS_X, CF_Y) \approx T$ where $\alpha$ is a set of thermal parameters for the workpiece, $CF_Y$ is a set of correction factors, and $f(\ )$ is a function which approximates the temperature of said workpiece based on $TS_X, \alpha$, and $CF_Y$; (2) measuring an actual temperature profile $A(TS_X)$ of the workpiece in the furnace with the heater thermostats at the settings $TS_X$; (3) terminating if the measured actual temperature profile $A(TS_X)$ matches the target temperature profile T within a predetermined tolerance; otherwise, (4) determining a new set of correction factors which satisfies an equation $f(\alpha, TS_X, CF_Y) = A(TS_X)$; and thereafter repeating the above steps.

16 Claims, 8 Drawing Sheets

FIG.3 eq.1 ∼ GENERATE $TS_1$ SUCH THAT $f(\alpha, TS_1)+0 \approx T$ eq.2 ∼ GENERATE $CF_1$ SUCH THAT $f(\alpha, TS_1)+CF_1 = A(TS_1)$ eq.3 ∼ GENERATE $TS_2$ SUCH THAT $f(\alpha, TS_2)+CF_1 \approx T$ eq.4 ∼ GENERATE $CF_2$ SUCH THAT $f(\alpha, TS_2)+CF_2 = A(TS_2)$ eq.5 ∼ GENERATE $TS_3$ SUCH THAT $f(\alpha, TS_3)+CF_2 \approx T$

FIG. 5 eq. 10 $\quad f(\alpha, TS_x) = T_A + (T_0 - T_A) e^{\frac{-h(v)AT}{\rho C_p V}}$ eq. 11 $\quad h(v) = 0.664 \, R_e^{\frac{1}{2}} \, P_r^{\frac{1}{3}} \, \frac{K}{L}$ eq. 12 $\quad v_{I+1} = v_I \left( \frac{T_{I+1}}{T_I} \right)$ eq. 13 $\quad A(J-G) \approx \rho C_p V \frac{dT_0}{dT}$ eq. 14 $\quad f(\alpha, TS_x, CF_y) = T_A + (T_0 - T_A) e^{\frac{-h(v)A(CF_y)T}{\rho C_p V}}$ eq. 15 $\quad f(\alpha, TS_x, CF_y) = T_A + CF_y + [T_0 - (T_A + CF_y)] e^{\frac{-h(v)AT}{\rho C_p V}}$

FIG. 6A

AIR TEMPERATURE PROFILE MATRIX

|     | SZ1 | SZ2 | SZ3 | SZ4 | SZ5 | SZ6 | SZ7 | SZ8 | SZ9 | SZ10 |
|-----|-----|-----|-----|-----|-----|-----|-----|-----|-----|------|
| H1  | 26  | 30  | 33  | 37  | 40  | 51  | 62  | 73  | 84  | 95   |
| H2  | 106 | 117 | 128 | 139 | 150 | 161 | 172 | 183 | 194 | 205  |
| H3  | 216 | 227 | 238 | 249 | 260 | 266 | 272 | 278 | 284 | 290  |
| H4  | 296 | 302 | 308 | 314 | 320 | 326 | 332 | 338 | 344 | 350  |
| H5  | 356 | 362 | 368 | 374 | 380 | 384 | 388 | 392 | 396 | 400  |
| H6  | 404 | 408 | 412 | 416 | 420 | 422 | 424 | 426 | 428 | 430  |
| H7  | 432 | 434 | 436 | 438 | 440 | 438 | 436 | 435 | 433 | 431  |
| H8  | 429 | 427 | 426 | 424 | 422 | 421 | 421 | 420 | 419 | 419  |
| H9  | 418 | 417 | 416 | 416 | 415 | 414 | 413 | 413 | 412 | 411  |
| H10 | 410 | 409 | 409 | 408 | 407 | 408 | 408 | 409 | 409 | 410  |
| H11 | 411 | 411 | 412 | 412 | 413 | 413 | 413 | 414 | 414 | 414  |
| H12 | 414 | 414 | 415 | 415 | 415 | 412 | 410 | 407 | 404 | 402  |
| H13 | 399 | 396 | 393 | 391 | 388 | 385 | 381 | 378 | 375 | 372  |
| H14 | 368 | 365 | 362 | 358 | 355 | 350 | 344 | 339 | 333 | 328  |
| H15 | 322 | 317 | 311 | 306 | 300 | 285 | 270 | 255 | 240 | 225  |

FIG. 6B

AIR VELOCITY MATRIX

| | SZ1 | SZ2 | SZ3 | SZ4 | SZ5 | SZ6 | SZ7 | SZ8 | SZ9 | SZ10 |
|---|---|---|---|---|---|---|---|---|---|---|
| H1 | 0.250 | 0.282 | 0.314 | 0.347 | 0.379 | 0.483 | 0.587 | 0.691 | 0.795 | 0.900 |
| H2 | 1.004 | 1.108 | 1.212 | 1.316 | 1.420 | 1.525 | 1.629 | 1.733 | 1.837 | 1.941 |
| H3 | 2.045 | 2.150 | 2.254 | 2.358 | 2.462 | 2.519 | 2.576 | 2.633 | 2.689 | 2.746 |
| H4 | 2.803 | 2.860 | 2.917 | 2.973 | 3.030 | 3.087 | 3.144 | 3.201 | 3.258 | 3.314 |
| H5 | 3.371 | 3.428 | 3.485 | 3.542 | 3.598 | 3.636 | 3.674 | 3.712 | 3.750 | 3.788 |
| H6 | 3.826 | 3.864 | 3.902 | 3.939 | 3.977 | 3.996 | 4.015 | 4.034 | 4.053 | 4.072 |
| H7 | 4.091 | 4.110 | 4.129 | 4.148 | 4.167 | 4.150 | 4.133 | 4.116 | 4.098 | 4.081 |
| H8 | 4.064 | 4.047 | 4.030 | 4.013 | 3.996 | 3.990 | 3.983 | 3.976 | 3.970 | 3.963 |
| H9 | 3.956 | 3.950 | 3.943 | 3.937 | 3.930 | 3.922 | 3.915 | 3.907 | 3.900 | 3.892 |
| H10 | 3.884 | 3.877 | 3.869 | 3.862 | 3.854 | 3.860 | 3.866 | 3.871 | 3.877 | 3.883 |
| H11 | 3.888 | 3.894 | 3.900 | 3.905 | 3.911 | 3.913 | 3.915 | 3.917 | 3.919 | 3.920 |
| H12 | 3.922 | 3.924 | 3.926 | 3.928 | 3.930 | 3.904 | 3.879 | 3.853 | 3.828 | 3.802 |
| H13 | 3.777 | 3.751 | 3.725 | 3.700 | 3.674 | 3.643 | 3.612 | 3.580 | 3.549 | 3.518 |
| H14 | 3.487 | 3.455 | 3.424 | 3.393 | 3.362 | 3.310 | 3.258 | 3.205 | 3.153 | 3.101 |
| H15 | 3.049 | 2.997 | 2.945 | 2.893 | 2.841 | 2.699 | 2.557 | 2.415 | 2.273 | 2.131 |

PART TEMPERATURE MATRIX

| | SZ1 | SZ2 | SZ3 | SZ4 | SZ5 | SZ6 | SZ7 | SZ8 | SZ9 | SZ10 |
|---|---|---|---|---|---|---|---|---|---|---|
| H1 | 26.4 | 26.6 | 26.9 | 27.5 | 28.2 | 29.7 | 32.1 | 35.3 | 39.4 | 44.3 |
| H2 | 50.0 | 56.6 | 63.8 | 71.7 | 80.3 | 89.3 | 98.8 | 108.8 | 119.2 | 129.8 |
| H3 | 140.8 | 152.0 | 163.5 | 175.1 | 186.8 | 197.9 | 208.3 | 218.2 | 227.7 | 236.7 |
| H4 | 255.5 | 262.4 | 269.2 | 275.9 | 282.6 | 289.3 | 295.9 | 302.5 | 309.0 | 315.5 |
| H5 | 322.0 | 328.4 | 334.8 | 341.2 | 347.6 | 353.7 | 359.4 | 364.8 | 370.1 | 375.1 |
| H6 | 380.0 | 384.8 | 389.5 | 394.1 | 398.5 | 402.6 | 406.3 | 409.8 | 413.0 | 415.9 |
| H7 | 421.3 | 423.5 | 425.7 | 427.9 | 430.0 | 431.5 | 432.3 | 432.7 | 432.8 | 432.4 |
| H8 | 433.7 | 432.6 | 431.4 | 430.0 | 428.7 | 427.4 | 426.2 | 425.1 | 424.1 | 423.1 |
| H9 | 422.2 | 421.3 | 420.5 | 419.7 | 418.9 | 418.1 | 417.3 | 416.5 | 415.7 | 414.9 |
| H10 | 414.1 | 413.3 | 412.5 | 411.7 | 410.9 | 410.3 | 410.0 | 409.8 | 409.7 | 409.7 |
| H11 | 409.9 | 410.1 | 410.4 | 410.7 | 411.1 | 411.5 | 411.8 | 412.1 | 412.4 | 412.7 |
| H12 | 412.9 | 413.2 | 413.4 | 413.7 | 413.9 | 413.6 | 412.9 | 411.9 | 410.6 | 409.1 |
| H13 | 407.3 | 405.4 | 403.4 | 401.3 | 399.1 | 396.7 | 394.2 | 391.5 | 388.8 | 386.0 |
| H14 | 383.1 | 380.1 | 377.2 | 374.1 | 371.1 | 367.7 | 363.9 | 360.0 | 355.8 | 351.5 |
| H15 | 347.0 | 342.4 | 337.7 | 332.9 | 328.0 | 321.8 | 314.5 | 306.4 | 297.5 | 288.1 |

PROCESS AND APPARATUS FOR PRODUCING TEMPERATURE PROFILES IN A WORKPIECE AS IT PASSES THROUGH A BELT FURNACE

BACKGROUND OF THE INVENTION

This invention relates to belt furnaces; and more particularly, it relates to methods and apparatus for establishing certain target temperature profiles in a workpiece as it passes through a belt furnace.

Belt furnaces are widely used by manufacturers of integrated circuits. Each furnace includes an elongated passageway along which a plurality of spaced apart heaters are disposed; and a belt moves from one end of the passageway to the other to thereby carry a workpiece sequentially past the heaters. Typically, the workpiece is an integrated circuit package in which a silicon die, or a lid, or a heatsink is being attached with an adhesive. Each of the heaters has its own individual thermostat; and so the workpiece can be subjected to a temperature profile which varies in a certain desired fashion along the passageway. This temperature profile is chosen such that the adhesive cures properly, and at the same time, thermally induced stresses in the package are maintained at a tolerable level.

However, the thermostat temperature settings for the heaters do not have a one-to-one correspondence with the temperature of the workpiece along the passageway; and, there are many technical reasons why this is so. For example, (1) the workpiece is moving, and it takes time for its temperature to change as it moves from one heater to another; (2) the amount of heat transferred to the workpiece depends on the size of the passageway and the velocity of air in the passageway; (3) a workpiece having a large mass will heat slower than a workpiece having a small mass; (4) a workpiece with a shiny surface will absorb less radiated heat than a workpiece with a dull surface; (5) a workpiece having a large contact area with the belt 13 will lose/gain more heat via conduction to/from the belt itself than a workpiece with a small contact area; and, (6) air temperature in the passageway varies in a nonlinear fashion midway between two consecutive heaters.

This then presents the problem of how to set the belt furnace thermostats in order to achieve the target temperature profile in the workpiece itself. In the prior art, this problem was addressed by a trial-and-error or guessing-game method. Using this method, an operator would make an initial guess, based on his training and experience, as to what the thermostat setting should be; and he would then set the thermostats accordingly. After the furnace temperatures at those settings had stabilized, the operator would send the workpiece through the furnace with a thermocouple attached to it to obtain an actual temperature profile of the workpiece. This actual temperature profile was then compared by the operator to the desired target temperature profile; and if their differences were too large, the operator would make another guess on how the thermostats should be set. These steps were repeated over and over until the actual temperature profile matched the target temperature profile within a certain allowable tolerance.

A major problem, however, with the above prior art method is that it takes too long. Each time the thermostat settings are changed, several hours (typically 6-7 hours) must pass before an actual temperature profile can be made. This time is needed to ensure that the furnace temperatures have stabilized. Thus, a single incorrect guess on what the thermostat setting should be adds 6-7 hours to the overall process. Some guesses will be too high while other guesses will be too low; and to arrive at the target profile typically takes more than a dozen guesses. Also, a single integrated circuit package usually requires several temperature profiles (i.e., one to attach the die, one to attach the lid, one to attach the heat sink); and the thermostat setting to achieve these profiles will be different for each different type of integrated circuit package.

Accordingly, a primary object of the invention is to provide a method and apparatus for achieving a target temperature profile in a workpiece as it passes through a belt furnace, which is substantially faster than the prior art.

BRIEF SUMMARY OF THE INVENTION

In one preferred embodiment of the present invention, a given target temperature profile is produced in a workpiece as it passes through an elongated passageway of a belt furnace by the steps of:

determining a set of temperature settings $TS_X$ for the belt furnace thermostats which satisfy an equation $f(\alpha,TS_X)+CF_Y \approx T$ where $\alpha$ is a set of thermal parameters for the workpiece, $f(\alpha,TS_X)$ is a function which approximates the temperature of said workpiece based on the thermostat temperature settings $TS_X$ and the workpiece parameters $\alpha$, and $CF_Y$ is a set of correction factors which compensate for errors in the approximation;

measuring an actual temperature profile $A(TS_X)$ of the workpiece in the furnace with the heater thermostats at the settings $TS_X$;

terminating the process if the measured actual temperature profile $A(TS_X)$ matches the target temperature profile $T$ within a predetermined tolerance; otherwise, determining a new set of correction factors which satisfies an equation $f(\alpha,TS_X)+CF_Y=A(TS_X)$; and thereafter repeating the above steps.

As one specific example of the function $f(\alpha,TS_X)$, it can equal $$T_A + (T_o - T_A)\text{EXP}\left[\frac{-h(v)A\tau}{\rho C_P V}\right]$$

where $T_0$ is the temperature of the workpiece at the start of a region in the passageway; $T_A$ is the air temperature in that region; $A$, $V$, $\rho$, $C_P$ respectively are the surface area, volume, density, and heat capacity of the workpiece; and $\tau$ is the time that the workpiece spends in the region.

BRIEF DESCRIPTION OF THE DRAWINGS

Various features and advantages of the invention are described herein in conjunction with the accompanying drawings wherein:

FIG. 3 illustrates, in equation form, the process by which the FIG. 2 controller operates to achieve a target temperature profile;

FIG. 5 shows several functions which approximate the temperature of the workpiece as one step of the FIG. 3 –FIG. 4 process; and FIGS. 6A–6C show a numerical example of how the FIG. 5 functions are evaluated.

DETAILED DESCRIPTION OF THE INVENTION

Figure 1:
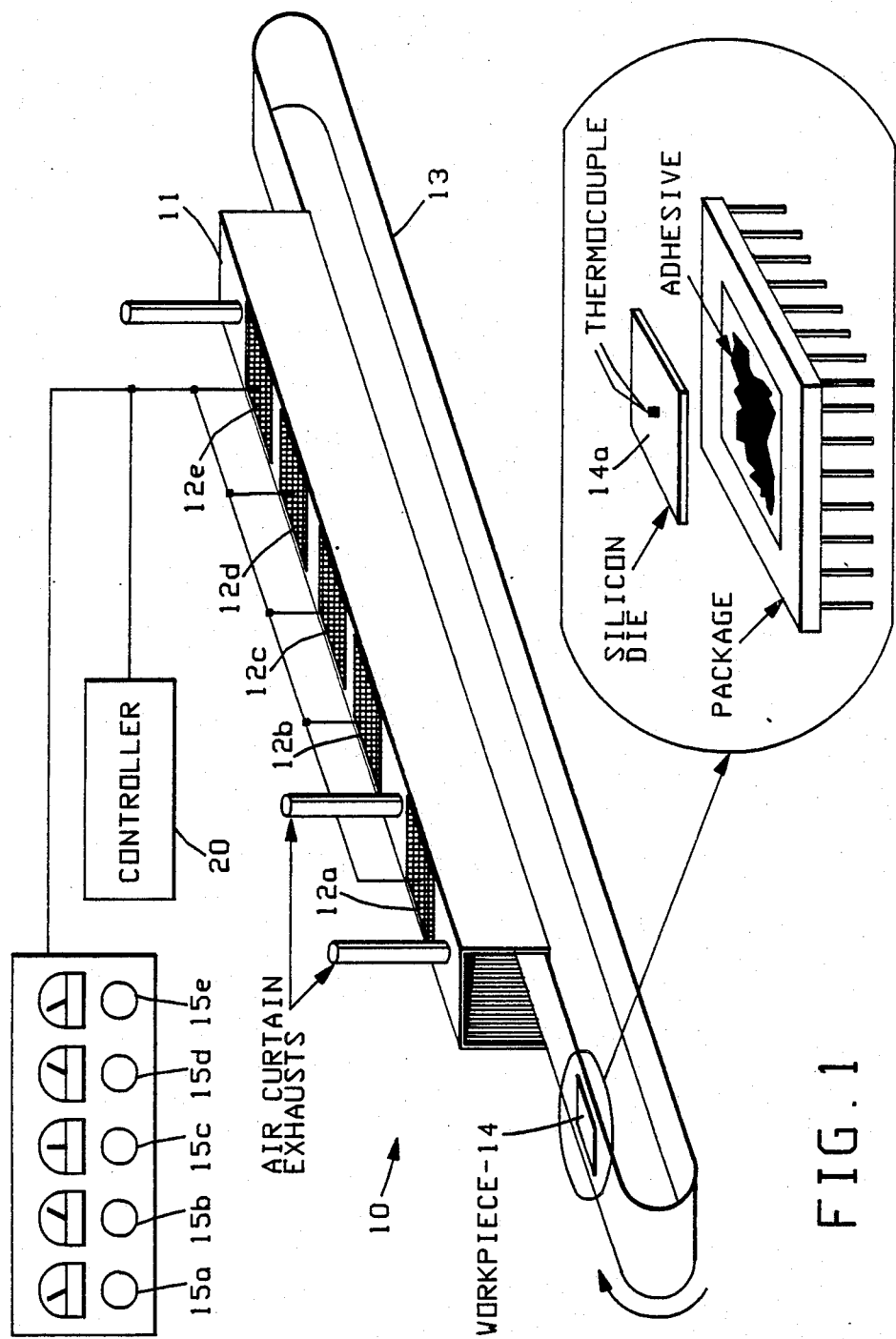
FIG. 1 illustrates a belt furnace which incorporates a controller that achieves target temperature profiles in accordance with the invention.

Referring now to FIG. 1, it shows a belt furnace which operates in conjunction with a controller 20 that is constructed according to the invention. Included in the furnace 10 is an elongated passageway 11, a series of spaced apart heaters 12a–12e which are disposed in the passageway, and a belt 13 which moves through the passageway way and carries a workpiece 14 past the heaters. Each of heaters 12a–12e has its own separate thermostat 15a–15e respectively which enables the temperature of each heater to be separately set. Thus, the workpiece 14 can be subjected to a temperature profile which varies from heater to heater along the passageway.

However, as was pointed out in the Background of the Invention, the thermostat settings for the heaters 12a–12e do not have a one-to-one correspondence with the temperature of the workpiece 14 along the passageway. On the other hand, in order to process the workpiece 14 in a precise fashion, it is the temperature profile of the workpiece itself that needs to be controlled accurately (as opposed to the temperature profile of the heaters). Thus, the difficult problem which the present invention addresses is how to set the heater thermostats 15a–15e such that a desired temperature profile is obtained in the workpiece 14.

Figure 2:
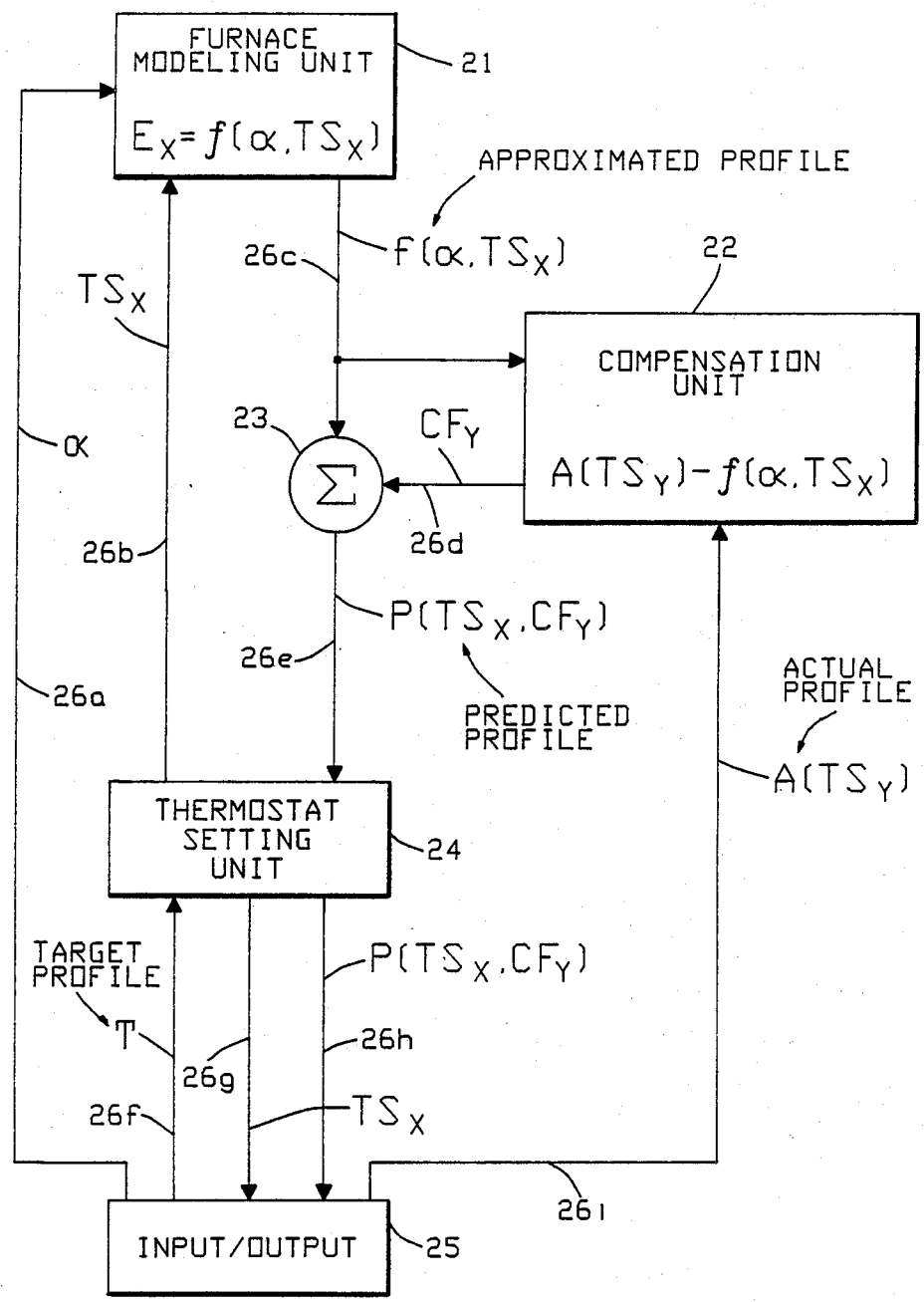
FIG. 2 illustrates the structural details of the FIG. 1 controller.

With the present invention, the above problem is solved by the controller 20 which is shown as a labeled box in FIG. 1 and is shown in greater detail in FIG. 2. Included in the FIG. 2 controller 20 is a furnace modeling unit 21, a compensation unit 22, a summer unit 23, a thermostat setting unit 24, and an input/output device 25. All of these units are interconnected via respective sets of signal lines 26a–26i as FIG. 2 shows.

Unit 21 operates by receiving a set of thermal parameters for the workpiece 14 and the furnace 10 over the input lines 26a from an operator of the I/O unit 25. These parameters are described individually in conjunction with FIG. 5, and they are indicated as a set by the Greek letter $\alpha$. Unit 21 also receives a set of temperature settings $TS_X$ for the furnace thermostats on its input lines 26b; and in response, unit 21 evaluates a function $f(\alpha, TS_X)$ which approximates the temperature profile that will result in the workpiece. Specific examples of the function $f(\alpha, TS_X)$ are explained in further detail in conjunction with FIG. 6. Signals representing the approximated temperature profile are generated on the output lines 26c.

Unit 23 is a summer which receives the approximated temperature profile of the workpiece and adjusts each point of that profile either upward or downward by a respective compensation term. Symbol $CF_Y$ in FIG. 2 indicates the set of compensation terms, and it includes one term for each point in the approximated temperature profile $f(\alpha, TS_X)$. Adding the set of compensation terms $CF_Y$ to the approximated temperature profile yields a predicted temperature profile for the workpiece which is indicated as $P(TS_X, CF_Y)$. Signals representing this predicted profile $P(TS_X, CF_Y)$ are generated on the set of lines 26e.

Unit 24 receives the predicted temperature profile on the lines 26e, and it also receives a target temperature profile (i.e., desired temperature profile) for the workpiece on the lines 26f from the operator of the I/O unit 25. Unit 24 compares the target temperature profile to the predicted temperature profile; and, based on any differences between the two, it generates a new set of thermostat settings $TS_X$ on its output lines 26b. Using these new thermostat settings $TS_X$, the furnace modeling unit 21 generates a new approximate temperature profile for the workpiece; and the summer 23 generates a new predicted temperature profile for the workpiece. Unit 24 then compares the target temperature profile T with the new predicted temperature profile. If the predicted temperature profile matches the target profile within a certain allowable tolerance, unit 24 sends the temperature setting $TS_X$ which caused the match on the lines 26g to the I/O unit 25. Otherwise, unit 24 alters the temperature settings $TS_X$ and the above process steps are repeated.

After a set of temperature settings which cause a match are sent to the I/O unit 25, an operator sets the thermostats 15a–15e to those settings. Then, after the furnace temperatures have stabilized at the new settings, the operator sends the workpiece 14 with a thermocouple 14a (FIG. 1) attached to it through the passageway 11. This step provides an actual temperature profile $A(TS_X)$ for the workpiece at the temperature settings $TS_X$.

This actual temperature profile $A(TS_X)$ is then compared by the operator to the target profile T. If the two profiles are suitably close, the process stops. Otherwise, the actual profile $A(TS_X)$ is entered by the operator via the input/output device 25 to the compensation unit 22. In response, the compensation unit 22 generates a new set of compensation factors $CF_Y$. This it does by evaluating the equation $CF_Y = A(TS_X) - f(\alpha, TS_X)$.

Unit 22 then sends the new set of compensation factors $CF_Y$ to the summer unit 23 which in turn causes the predicted temperature profile of the workpiece to change. Due to this change, differences will exist between the target temperature profile T and the predicted temperature profile $P(TS_X, CF_Y)$, and those differences are detected by the thermostat setting unit 24. To eliminate those differences, unit 24 then selects new temperature settings $TS_X$ and it sends those new temperature settings on the lines 26b to the furnace modeling unit 21. Units 21, 22, and 24 then sequentially interact as previously described until a set of thermostat settings is reached which causes the predicted temperature profile and the target temperature profile to again match within an allowable tolerance. That set of temperature settings which causes the match is sent by unit 24 to the I/O unit 25, and the operator uses them to reset the furnace thermostates 15a–15e and obtain another actual temperature profile for the workpiece through the furnace.

By experiment, the inventors have found that by the above process, the actual temperature profile converges to the target temperature profile after just two to five actual temperature profiles are made. Obtaining each actual temperature profile takes about six hours (since changes in the thermostat settings produce temperature transients in the furnace which must be allowed to settle); and so the target profile can be achieved in about one day. This compares very favorably to the prior art "guessing game" method which often takes one to two weeks to complete. Further, the above described process can be carried out by an operator who essentially has no training or expertise in belt furnaces; whereas correctly guessing the furnace temperature settings in the prior art "guessing game" method requires considerable belt furnace expertise.

Considering now FIG. 3, it shows the above-described process in an equation form. Initially, as is indicated by equation 1, the first set of temperature settings $TS_1$ for the belt furnace thermostats is determined by the units 21–24 such that the corresponding predicted temperature profile for the workpiece $f(\alpha, TS_1) + CF_0$ matches the target profile T. For this first predicted temperature profile of the workpiece, the set of compensation factors $CF_0$ may be zero.

Thereafter, the operator sets the thermostats of the belt furnace heaters to the temperature setting $TS_1$, and he sends the workpiece 14 with its thermocouple 14a through the furnace passageway. This provides the first actual temperature profile $A(TS_1)$; and, since it is the first one, it probably will differ from the target profile. If differences occur, the actual temperature profile $A(TS_1)$ is entered by the operator into the compensation unit 22 which generates a set of compensation factors $CF_1$. These correction factors, as equation 2 states, are selected such that when they are added to the approximated temperature profile $f(\alpha, TS_1)$, the result equals the actual temperature profile $A(TS_1)$.

Adding the set of correction factors $CF_1$ to the approximated temperature profile $f(\alpha, TS_1)$ yields a new predicted temperature profile $f(\alpha, TS_1) + CF_1$. This predicted temperature profile will be different than the target temperature profile T, and that difference is sensed by the thermostat setting unit 24. In response, unit 24 generates a new set of thermostat settings $TS_2$ such that the corresponding predicted temperature profile $f(\alpha, TS_2) + CF_1$ matches the target profile T. This is stated by equation 3. To determine the set of temperature settings $TS_2$, the thermostat setting unit 24 together with the furnace modeling unit 21 and the summer unit 23 make several iterations, as was previously described.

Thereafter, the operator sets the thermostats of the belt furnace heaters to correspond to the new temperature settings $TS_2$. Next, the workpiece 14 is sent with its thermocouple through the furnace passageway to thereby obtain the actual temperature profile $A(TS_2)$. That actual temperature profile $A(TS_2)$ is compared to the target profile T, and if it is suitably close, the process stops. Otherwise, the actual temperature profile $A(TS_2)$ is entered into the compensation unit 22 which generates a new set of correction factors $CF_2$ as given by equation 4. This set of correction factors $CF_2$ plus the approximated temperature profile $f(\alpha, TS_2)$ equals the actual temperature profile.

Adding the set of correction factors $CF_2$ to the approximated temperature profile $f(\alpha, TS_2)$ yields the predicted temperature profile $P(TS_2, CF_2)$. Differences between this predicted temperature profile and the target temperature profile T are sensed by the thermostat setting unit 24 which in turn generates another set of thermostat settings $TS_3$ such that the corresponding predicted temperature profile $f(\alpha, TS_3) + CF_2$ does match the target profile T. This is stated by equation 5. Then, the process steps of the immediately preceding paragraph and this paragraph are repeated (with the subscripts of the TS and CF terms being increased by one).

Figure 4A:
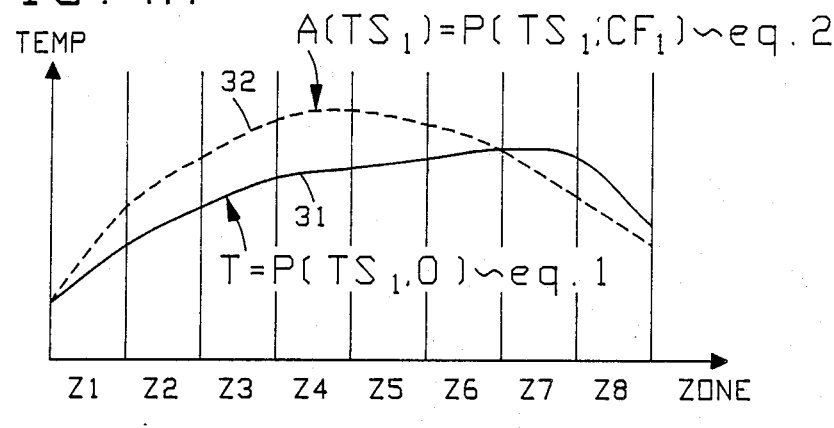
FIGS. 4A–4C are is a set of curves which illustrate in a graphical form the process by which the FIG. 2 controller operates to achieve a target temperature profile.
Figure 4B:
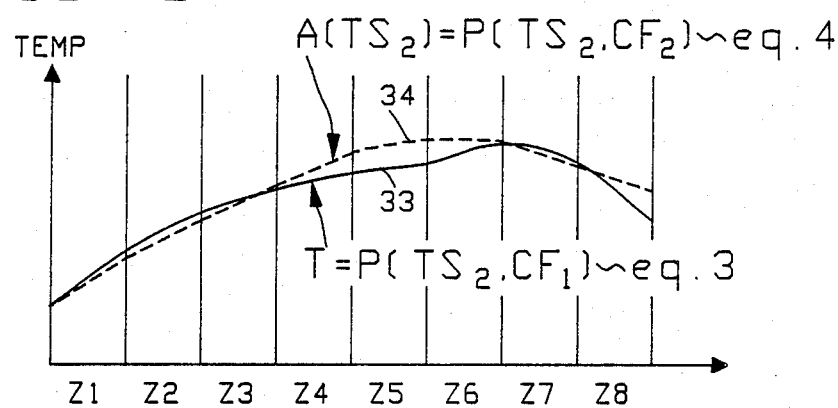
Figure 4C:
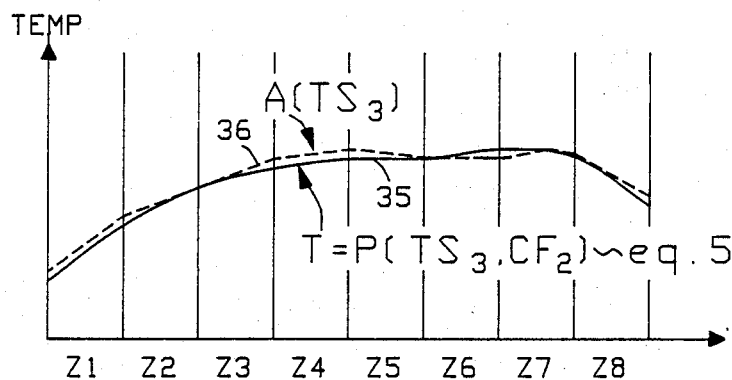

Turning now to FIGS. 4A–4C, they show a set of temperature profiles which illustrate the above process in a graphical fashion. In each of these figures, the location in the belt furnace passageway 11 is shown on the horizontal axis, and temperature is shown on the vertical axis. Also in these figures, the horizontal axis (belt furnace passageway) is divided into eight heater zones Z1–Z8, which of course is as just one example since the furnace can have any number of heaters.

In FIG. 4A, a curve 31 illustrates a target profile T for the workpiece. Given this target temperature profile, the furnace modeling unit 21, summer 23, and thermostat setting unit 24 operate together to determine the first set of thermostat settings $TS_1$ such that the first predicted temperature profile $f(\alpha, TS_1) + CF_0$ matches the target profile. This is stated by equation 1.

Using the thermostat settings $TS_1$, an actual temperature profile $A(TS_1)$ is obtained by sending a workpiece with a thermocouple through the belt furnace. Curve 32 of FIG. 4A illustrates an example of this actual temperature profile. This actual temperature profile of curve 32 differs from the target temperature profile T of curve 31, and so a set of correction factors $CF_1$ is determined which makes the predicted temperature profile $P(TS_1 CF_1)$ match the actual temperature profile $A(TS_1)$. This is stated by equation 2.

Comparing curves 31 and 32 shows that the predicted temperature profile $P(TS_1, CF_1)$ differs from the target temperature profile T. To get them to match, the set of temperature settings $TS_1$ is changed to a new set $TS_2$. This is illustrated in FIG. 4B by a curve 33, and it is stated by equation 3. Thereafter, the thermostats of the belt furnace are set to the temperature settings $TS_2$ and an actual temperature profile of the workpiece at those settings is obtained. This actual temperature profile $A(TS_2)$ is illustrated in FIG. 4B by a curve 34.

The actual temperature profile $A(TS_2)$ of curve 34 is closer to the target T than the previous actual temperature profile $A(TS_1)$ but, it still differs from the target and the corresponding predicted temperature profile $P(TS_2, CF_1)$. To correct for these differences, another set of correction factors $CF_2$ is determined which makes the predicted temperature profile $P(TS_2, CF_2)$ equal to the actual temperature profile $A(TS_2)$. This is stated by equation 4. Thereafter, another set of thermostat settings $TS_3$ is determined such that the predicted temperature profile $P(TS_3, CF_2)$ matches the target profile. This is illustrated in FIG. 4C by a curve 35, and it is stated by equation 5.

Then, the thermostats of the belt furnace are set to the new temperature settings $TS_3$, and an actual temperature profile of the workpiece at those settings $A(TS_3)$ is obtained. This actual temperature profile is illustrated in FIG. 4C by a curve 36. If that actual temperature profile as given by a curve 36 is close enough to the target temperature profile as given by a curve 35 to be considered a match, then the process terminates. Otherwise, the process continues by (1) determining another set of correction factors $CF_3$ which would make the predicted temperature profile $P(TS_3, CF_3)$ equal to the actual temperature profile $A(TS_3)$; (2) determining a new set of temperature settings $TS_4$ such that the predicted temperature profile $P(TS_4, CF_3)$ matches the target; and (3), repeating the steps of the start of this paragraph using the new temperature settings $TS_4$.

Next, referring to FIG. 5, it shows several preferable functions that approximate the temperature profile of the workpiece. Beginning with equation 10, it approximates the temperature of the workpiece by estimating heat transfers due to convection only. Other forms of heat transfer such as by conduction and radiation are ignored in equation 10.

In equation 10, $T_0$ is the temperature of the workpiece as it enters a particular heater zone in the belt furnace passageway; $T_A$ is the temperature of the air in that zone; $\tau$ is the time which the workpiece spends in that zone; A is the workpiece surface area; V is the workpiece volume; $C_P$ is the workpiece heat capacity; $\rho$ is the workpiece density; "e" is the natural log of 2; and h(v) is a function of air velocity v in the belt furnace passageway as is given by equation 11. In equation 11, $R_e$ is the Reynolds number (which varies directly with air velocity); $P_r$ is Prandtl number; K is thermal conductivity of air, and L is workpiece length.

Figure 6C:
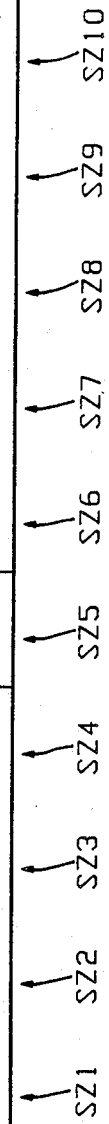

To obtain the approximate temperature profile of the workpiece, equation 10 needs to be evaluated at multiple points along the belt furnace passageway. Such an evaluation is illustrated in FIGS. 6A–6C. There, each figure contains a matrix; and the number of rows in the matrix equals the number of heaters in the belt furnace, while the number of columns equals the number of subzones under each heater. In FIGS. 6A–6C, each matrix has fifteen rows and ten columns, as one example.

Entries in the top row of the FIG. 6A matrix give the air temperature in ten subzones under the first heater; entries of the next row give the air temperatures in the ten subzones under the second heater; etc. Subzone 10 for the ith heater is adjacent to subzone 1 of the next heater. Air temperature near the center of each heater (e.g. subzone 5) equals the corresponding thermostat setting $TS_X$ for that heater; and air temperature at the remaining heater subzones are approximated by linear interpolation.

Given the temperature matrix of FIG. 6A, the air velocity at each subzone of the furnace heaters can be approximate by measuring air velocity at the furnace entrance end and applying equation 12 of FIG. 5 to the remaining furnace subzones. In equation 12, v is air velocity, T is air temperature, and the indices i and i+1 indicate adjacent subzones. Results of such an evaluation are presented in the matrix of FIG. 6B.

After the air temperatures and air velocities of FIGS. 6A and 6B are determined, the workpiece temperature can now be approximated by evaluating equation 10 for each of the heater subzones. Such an evaluation results in the matrix of FIG. 6C. In this evaluation, the fixed parameter meter of equation 10 were as follows: A equaled $2.09 \times 10^{-3}$ m$^2$, V equaled $5.31 \times 10^{-6}$ m$^3$, $C_P$ equaled 837 joules/KG$^{0c}$, $\rho$ equaled 3600Kg/m$^3$ and $\tau$ equaled 12 sec.

Evaluation of equation 10 is done in a sequential fashion for the subzones 1 thru 10 of the first heater. Thereafter, equation 10 is sequentially evaluated for the subzones 1 thru 10 of the second heater; etc. After this evaluation is complete for all of the heater subzones, the workpiece temperatures at the central subzones (e.g., the fifth subzone) are used as the approximated temperature profile $A(TS_X)$.

A preferred embodiment of the invention has now been described in detail. In addition, however, many changes and modifications can be made to these details without departing from the nature and spirit of the invention. For example, if the belt furnace is of a type which transfers heat to the workpiece primarily through radiation, then equation 10 of FIG. 5 should be replaced with another equation which approximates the radiation mode of heat transfer. One suitable equation is given by equation 13 in FIG. 5. There, J is radiosity, G is irradiation; and the remaining terms of A, C, $C_P$, V, $T_0$, $\rho$ and $\tau$ are as defined in equation 10.

Also, the correction factors $CF_Y$ can be combined with the approximated temperature profile $f(\alpha,TS_X)$ by ways other than addition to form the predicted temperature profile. For example, the correction factor can be inserted in the exponential term of equation 10, and that results in equation 14. With this modification, the correction factors $CF_Y$ would initially all be "1"; and they would subsequently be modified in the previously described sequence of FIG. 3 with $f(\alpha,TS_X)+CF_Y$ being replaced with $f(\alpha,TS_X,CF_Y)$ of equation 14. As another example, the correction factor can be inserted as a multiplier of the exponential term and as an additive factor; and this is illustrated by equation 15 in FIG. 5.

Further, the various units 21–25 which make up the controller of FIG. 2 can be implemented several different ways. For example, the units 21–24 can be special purpose digital logic circuits, and unit 25 can be a keyboard. Alternatively, units 21–24 can be respective modules of a computer program which run as a single general purpose digital computer.

Also, the initial set of correction factors $CF_0$ in equation 1 of FIG. 3 need not be zero. Suppose, for example, that a temperature profile has already been established for a first workpiece in a belt furnace as described above, and the same or similar profile is to now be established for a second workpiece. In such a case, the final set of compensation terms $CF_X$ which was used in determining the thermostat setting for the first workpiece can be the initial set of compensation terms $CF_0$ in establishing the thermostat settings for the second workpiece.

Further, in the matrices of FIGS. 6A–6C, the number of subzones per furnace heater (i.e., the number of columns per row) is not limited to ten. Preferably, however, the number of subzones per heater is from five to fifteen. Fewer than five subzones tends to make the approximation too inaccurate, while more than fifteen subzones tends to complicate the process without additional benefit.

Also, in the matrix of FIG. 6A, the air temperature in the heater subzones can be approximated from the thermostat settings in a non-linear fashion. For example, several subzones near the central subzone of each heater can be assigned the temperature of the corresponding heater thermostat; and temperature differences between adjacent heaters can occur in the remaining peripheral subzones.

Accordingly, it is to be understood that the invention is not limited to the above-described details but is defined by the appended claims.

What is claimed is:

1. A manufacturing process in which a given target temperature profile T is established in a workpiece, said process including the steps of:
   providing a belt furnace with a plurality of spaced apart heaters in an elongated passageway and respective thermostats for the heaters;
   adjusting said belt furnace thermostats to respective temperature settings $TS_X$ which satisfy a first equation $f(\alpha,TS_X, CF_Y) \approx T$ where $\alpha$ is a set of thermal parameters for the workpiece, f( ) is a function which approximates the temperature of said workpiece using said thermostat settings $TS_X$ and said workpiece thermal parameters $a$, and $CF_Y$ is a set of correction factors which compensate for errors in the approximation;

passing said workpiece through said belt furnace with said heater thermostats at said setting $TS_X$;

measuring an actual temperature profile $A(TS_X)$ of said workpiece during said passing step;

repeating said passing step on multiple workpieces if said measured actual temperature profile $A(TS_X)$ matches said target temperature profile T within a predetermined tolerance; otherwise, determining a new set of correction factors $CF_Y$ which satisfies a second equation $f(a, TS_X, CF_Y) = A(TS_X)$; and thereafter repeating the above steps with said new set of correction factors in said first equation.

2. A process according to claim 1 wherein said function $f(\ )$ approximates temperature changes in said workpiece due to convection and ignores temperature changes due to conduction and radiation.

3. A process according to claim 1 wherein said function $f(\ )$ approximates temperature changes in said workpiece due to radiation and ignores temperature changes due to conduction and convection.

4. A process according to claim 1 wherein said function $f(\ )$ is of the form:

$$f(\ ) = T_A = (T_o - T_A)\text{EXP}\left[\frac{-h(v)A\tau}{\rho C_P V}\right] + CF_Y$$

where $T_0$ is temperature of said workpiece at the start of a region in said passageway; $T_A$ is the air temperature in said region; A, V, $\rho$, $C_P$ respectively are the surface area, volume, density, and heat capacity of said workpiece; h(v) is a function if air velocity v in said region; and $\tau$ is the time that said workpiece spends in said region.

5. A process according to claim 1 wherein said function $f(\ )$ is of the form:

$$f(\ ) = T_A + (T_o - T_A)\text{EXP}\left[\frac{-h(v)A\tau CF_Y}{\rho C_P V}\right]$$

where $T_0$ is the temperature of said workpiece at the start of a region in said passageway; $T_A$ is the air temperature in said region; A, V $\rho$, $CP_P$ respectively are the surface area, volume, density, and heat capacity of said workpiece; h(v) is a function of air velocity v in said region; and $\tau$ is the time that said workpiece spends in said region.

6. A process according to claim 1 wherein said function $f(\ )$ is of the form:

$$f(\ ) = T_A + CF_Y + [T_o - (T_A + CF_Y)]\text{EXP}\left[\frac{-h(v)A\tau}{\rho C_P V}\right]$$

where $T_0$ is the temperature of said workpiece at the start of a region in said passageway; $T_A$ is the air temperature in said region; A, V, $\rho$, $C_P$ respectively are the surface area, volume, density, and heat capacity of said workpiece; h(v) is a function of air velocity v in said region; and $\tau$ is the time that said workpiece spends in said region.

7. A process according to claim 1 wherein said function of $f(\ )$ is evaluated in a sequential fashion for a plurality of subregions along said passageway which ranges from five to fifteen per furnace heater.

8. A manufacturing system, for producing a target temperature profile T in a workpiece; said system comprising:

a belt furnace which has a plurality of spaced apart heaters in an elongated passageway and respective thermostats for said heaters; and a controller for selecting a set of settings $TS_X$ for said thermostats;

said controller including a means for approximating the temperature profile T which will occur in said workpiece as it passes through said furnace passageways by evaluating an equation $f(a, TS_X, CF_Y) \approx T$ where $f(\ )$ is a function of said thermostat settings $TS_X$ and a set of thermal parameters $a$ for said workpiece and a set of correction factors $CF_Y$; and said controller further including a means for compensating for differences between the approximated temperature profile and the actual temperature profile that is produced when said workpiece is passed through said furnace, by modifying said correction factors.

9. A controller according to claim 8 wherein said function $f(\ )$ approximates temperature changes in said workpiece due to convection and ignores temperature changes due to conduction and radiation.

10. A controller according to claim 8 wherein said function $f(\ )$ approximates temperature changes in said workpiece due to radiation and ignores temperature changes due to conduction and convection.

11. A controller according to claim 8 wherein said function $f(\ )$ is of the form:

$$f(\ ) = T_A + (T_o - T_A)\text{EXP}\left[\frac{-h(v)A\tau}{\rho C_P V}\right] + CF_Y$$

where $T_0$ is the temperature of said workpiece at the start of a region in said passageway; $T_A$ is the air temperature in said region; A, V, $\rho$, $C_P$ respectively are the surface area, volume, density, and heat capacity of said workpiece; h(v) is a function of air velocity v in said region; and $\tau$ is the time that said workpiece spends in said region.

12. A controller according to claim 8 wherein said function $f(\ )$ is of the form $$f(\ ) = T_A + (T_o - T_A)\text{EXP}\left[\frac{-h(v)A\tau CF_Y}{\rho C_P V}\right]$$

where $T_0$ is the temperature of said workpiece at the start of a region in said passageway; $T_A$ is the air temperature in said region; A, V, $\rho$, $C_P$ respectively are the surface area, volume, density, and heat capacity of said workpiece; h(v) is a function of air velocity v in said region; and $\tau$ is the time that said workpiece spends in said region.

13. A controller according to claim 8 wherein said function $f(\ )$ is of the form:

$$f(\ ) = T_A + CF_Y + [T_o - (T_A + CF_Y)]\text{EXP}\left[\frac{-h(v)A\tau}{\rho C_P V}\right]$$

where $T_0$ is the temperature of said workpiece at the start of a region in said passageway; $T_A$ is the air temperature in said region; A, V, $\rho$, $C_P$ respectively are the surface area, volume, density, and heat capacity of said workpiece; h(v) is a function of air velocity v in said region; said $\tau$ is the time that said workpiece spends in said region.

14. A controller according to claim 8 wherein said function f( ) is evaluated in a sequential fashion for a plurality of subregions along said passageway which ranges from five to fifteen per furnace heater.

15. A controller according to claim 8 wherein said means for approximating and said means for compensating are comprised of digital logic circuits.

16. A controller according to claim 8 wherein said means for approximating and said means for compensating are comprised of computer programs in a general purpose digital computer.

* * * * *